United States Patent [19]

Bolzer

[11] Patent Number: 4,559,119

[45] Date of Patent: Dec. 17, 1985

[54] INSTALLATION AND PROCESS FOR THE PREPARATION OF ACID CASEINATES

[75] Inventor: René Bolzer, Brece, France

[73] Assignee: Laiterie Triballat, Noyal sur Vilaine, France

[21] Appl. No.: 709,341

[22] Filed: Mar. 6, 1985

Related U.S. Application Data

[63] Continuation of Ser. No. 559,420, Dec. 8, 1983, abandoned.

[30] Foreign Application Priority Data

Dec. 15, 1982 [FR] France .................................. 82 21035

[51] Int. Cl.⁴ ............................................. B01D 13/02
[52] U.S. Cl. .................................. 204/182.6; 204/301
[58] Field of Search ............................. 204/180 P, 301

[56] References Cited

U.S. PATENT DOCUMENTS

| 3,484,356 | 12/1969 | Goujard | 204/180 P |
| 3,698,918 | 10/1972 | Goujard | 204/180 P |
| 4,180,451 | 12/1979 | McRae | 204/180 P |

OTHER PUBLICATIONS

Perry, R. H., et al, *Chemical Engineers' Handbook*, McGraw-Hill Book Co., New York, Fifth Edition, 1973, pp. 19–83.

Primary Examiner—Andrew H. Metz
Assistant Examiner—B. J. Boggs, Jr.
Attorney, Agent, or Firm—Holman & Stern

[57] ABSTRACT

A milk supply pipe issues into a container. By means of a pipe (4), the container content is fed to an electrodialyzer. The electrodialyzed product is partly returned to the container.

4 Claims, 1 Drawing Figure

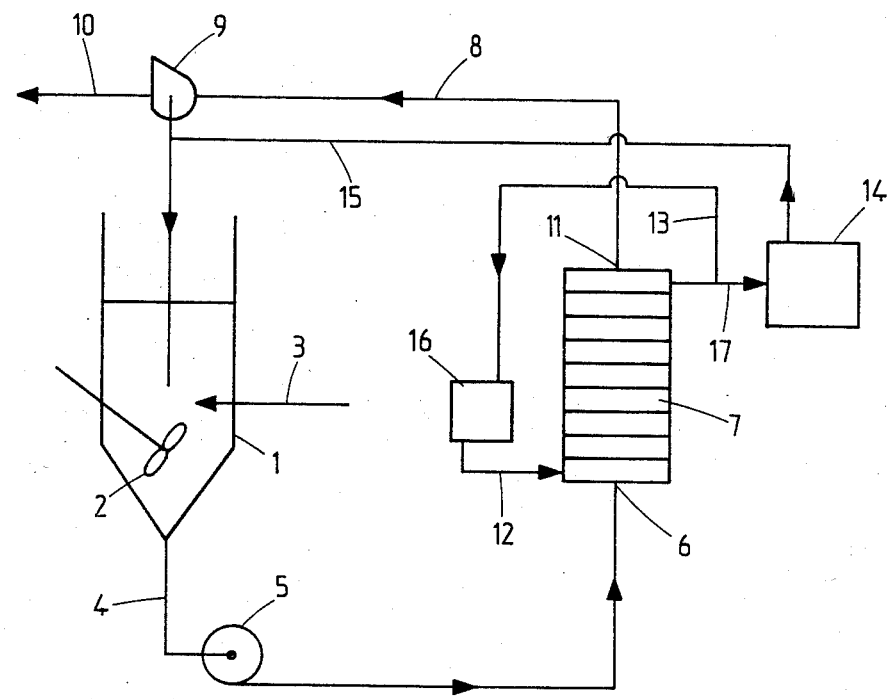

INSTALLATION AND PROCESS FOR THE PREPARATION OF ACID CASEINATES

This is a continuation of application Ser. No. 559,420, filed Dec. 8, 1983, now abandoned.

The present invention relates to installations and processes for the preparation of acid caseinates from milk.

On adding acid to milk in a quantity sufficient to bring the pH-value to approximately 4.6, the isoelectric point is reached at which the casein clots and separates from the lactoserum.

The invention proposes a process and an installation for the preparation of an acid caseinate, whose pH is well below 4.6 and which, without being a homogeneous liquid, as milk which has not clotted would be, remains a colloidal solution, despite having undergone a clotting destructuring the native casein micelles. In this colloidal solution, fine casein micelles are suspended in the lactoserum, but it is sufficiently liquid and homogeneous to then make it possible to carry out the necessary treatments and, more particularly, the production of the casein in a simple and effective manner and without it being necessary throughout the processes involved in converting milk into casein to cool the milk to a low temperature, with the considerable costs resulting therefrom. Moreover, the installation according to the invention can operate in a simple and continuous manner on an industrial scale, without regeneration or separation of resin balls forbidden by the food and health regulations in certain countries. This makes it possible to prevent the inevitable wetting of the milk on a resin installation, whilst leading to novel milk products.

The process according to the invention consists of raising a quantity of water-miscible liquid, serving as the pH-control, to a pH below approximately 3.5, then adding to this pH-control a milk quantity such that the pH of the two combined quantities remains below approximately 3.5.

It has been found that under these conditions, the milk, added to the pH-control, rapidly diffuses into the latter and rapidly assumes a pH-value below 3.5, so that the clotting which occurs does not give rise to large aggregates. Instead, micelles are formed, which are sufficiently fine to again pass into a colloidal solution, as would be the case if the pH did not drop rapidly well below the isoelectric point. Thus, a sufficiently homogeneous liquid is obtained to permit the transfer thereof to other treatment stages.

The present invention therefore relates to a process for the preparation of an acid caseinate having a pH below approximately 3.5, wherein it consists of circulating an acid caseinate having a pH below 3.5 in a closed circuit successively incorporating a container, a pipe passing from the container outlet to the inlet of an electrodialyzer the electrodialyzer and a pipe passing from the electrodialyzer outlet to the inlet of the container, removing a fraction of the acid caseinate in that part of the circuit passing from the electrodialyzer outlet to the container outlet and feeding milk into the circuit in that part of the circuit passing between the container inlet and the electrodialyzer inlet.

The invention is also directed at an installation comprising a container having two feed pipes and one discharge pipe opposite to one of the feed pipes, a cationic membrane electrodialyzer linked with the container by the two opposite pipes and a device mounted on the opposite intake pipe for diverting part of the liquid passing therethrough to a drain pipe. The term opposite is understood to mean that the liquid must traverse at least part of the container in order to pass from one pipe to the other. The installation comprises an ultrafiltration device on the pipe for discharging brine from the electrodialyzer and the pipe for discharging the retentate from the ultrafiltration device issues into the container of the pH-control or into the pipe or receptacle leading thereto. Thus, there is a recovery of the protein losses, which may occur in the electrodialyzer.

Preferably, the pH-control in the container had a pH below approximately 2.5. It is ensured that the pH of the two combined quantities in the container is below approximately 3.5, in order to keep well away from the lower limit for the pH-range of approximately 4 to 5, at which clotting occurs in an intense manner at the ambient temperature which the installation according to the invention can operate. The milk quantity added to the container is dependent on the quantity of miscible liquid used as the pH-control and on the pH of said miscible liquid quantity. The water-miscible liquid used as the initial pH-control, can be sour milk, acid caseinate, or some other acid milk product and, initially, even water.

There is a continuous drawing off from the container of a quantity substantially equal to the sum of the added milk quantity and the acid substance quantity.

Preferably, the addition flow to the container and the drawing off flow at the electro-dialyzer outlet are substantially identical so that, bearing in mind the liquid quantity used as the pH-control, the average residence time of the milk quantity with the quantity of liquid in the container serving as the pH-control must be between approximately 10 and 60 minutes.

The recirculation flow of the milk at the electrodialyzer outlet and towards the pH-control in the container is regulated in such a way that the pH of this control preferably remains below 2.5.

According to a variant, the container is supplied with preacidulated milk, or ultrafiltered milk, or an ultrafiltered milk retentate, or concentrated milk with a concentration factor up to 4, in order to reduce the treatment volumes and increase the efficiency of the installation.

The single drawing illustrates the installation.

From the conical bottom container 1 equipped towards the bottom with a stirrer 2, issue at mid-height, a pipe 3 for supplying fresh milk and from the bottom a discharge pipe 4 leading, via a pump 5, to an inlet 6 of a cationic membrane electrodialyzer 7. The electrodialyzer is traversed by two circuits. One of these has its inlet at 6 and an outlet at 11 and is used for the passage of milk. The other has an inlet at 12 and an outlet at 13 and is used for the passage of the brine, which is returned to a brine source 16.

From the top of container 1 issues a pipe 8 from the outlet of electrodialyzer 7. On said pipe 8 is mounted a device 9 making it possible to divert part of the liquid passing therein into a drain pipe 10 and which then serves for the production of casein or other milk products.

The acid caseinate contained in container 1 is used as a pH-control. The fresh milk arriving by pipe 3 in container 1 is converted into acid casein and assumes a pH of 3.4. All the acid caseinate is fed to the electrodialyzer 7 by pipe 4 and pump 5. It passes out of it via pipe 8 with a pH of 1.8 to 2.4. Part of this very acid caseinate is used for maintaining the pH in container 1, whilst the remainder is supplied by pipe 10 to the production process.

Downstream of outlet 13 is fitted a pipe 17 for temporarily supplying an ultrafiltration device 14, whose retentate discharge pipe 15 issues into the milk circuit, e.g. upstream or downstream of device 9, or even directly into container 1 or, if appropriate, into pipe 3.

The following example illustrates the invention:

In the installation according to the drawing, there is a conical bottom container, equipped with a dispersing stirrer and a pH-meter into which is introduced 10 m$^3$/h of skimmed milk at 12° C. and a pH of 2.5. The stirrer is started up.

Under the experimental conditions, at no time did the reaction reveal the clotting phenomenon. 10 m$^3$/h of skimmed milk at pH 6.7 was passed through pipe 3, 10 m$^3$/h was then drawn off by pipe 10 and 25 m$^3$/h were returned by pipe 8.

I claim:

1. A process for the preparation of an acid caseinate having a pH below approximately 2.5 which comprises circulating an acid caseinate having a pH below 2.5 in a closed circuit successively incorporating a container without intervening separating means, a pipe passing from the container outlet directley to the inlet of an electrodialyzer, the electrodialyzer and a pipe passing from the electrodialyzer outlet to the inlet of the container, removing a fraction of the acid caseinate in that part of the circuit passing from the electrodialyzer outlet to the container outlet and feeding milk into the circuit in that part of the circuit passing between the container inlet and the electrodialyzer inlet.

2. A process according to claim 1, wherein at the electrodialyzer outlet, the acid caseinate has a pH below approximately 2.5.

3. A process according to claim 1, wherein the recirculation flow at the outlet of the electrodialyzer to the container and the milk addition flow to the container are such that the average residence time of the milk in the container is between 10 and 60 minutes.

4. An installation for the preparation of an acid caseinate comprising a container having two intake pipes and a discharge pipe opposite to one of the intake pipes, said discharge pipe being connected directly without intervening separating means to a cationic membrane electrodialyzer having a circuit for brine and linked with the container by the two opposite pipes, a drain pipe, a device mounted on the opposite intake pipe for diverting towards the drain pipe part of the liquid passing therein and an ultrafiltration device mounted on the circuit for the brine from the electrodialyzer and downstream of the latter, the outlet of the ultrafiltration device issuing into the container supply circuit.

* * * * *